No. 668,255. Patented Feb. 19, 1901.
E. R. EDSON.
WASHING OR CLEANING APPARATUS.
(Application filed Nov. 9, 1899.)
(No Model.)
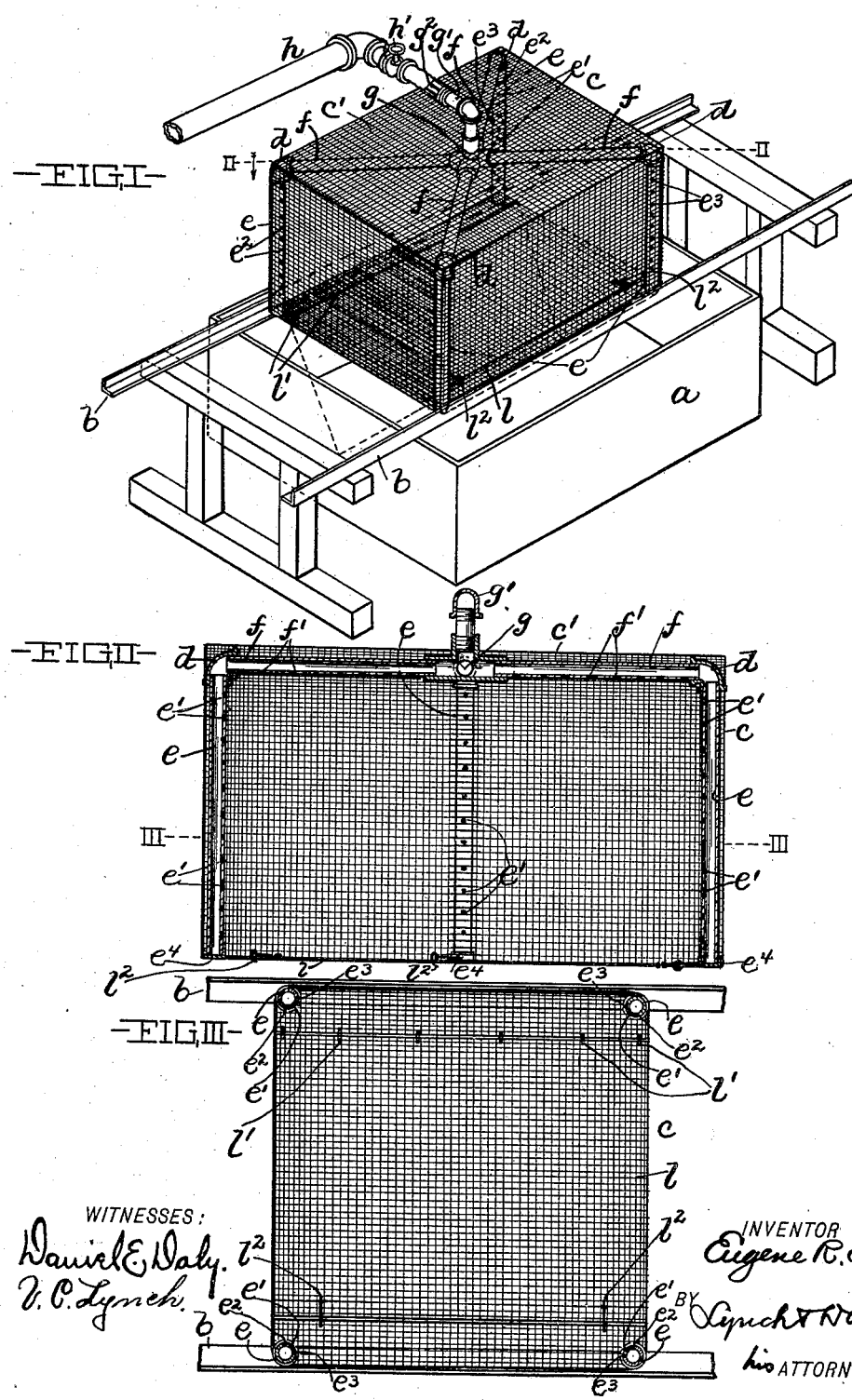
WITNESSES:
Daniel E. Daly.
V. C. Lynch.
INVENTOR
Eugene R. Edson
BY Lynch & Norer
his ATTORNEYS

UNITED STATES PATENT OFFICE.

EUGENE R. EDSON, OF CLEVELAND, OHIO, ASSIGNOR TO THE BUCKEYE FISH COMPANY, OF SAME PLACE.

WASHING OR CLEANING APPARATUS.

SPECIFICATION forming part of Letters Patent No. 668,255, dated February 19, 1901.

Application filed November 9, 1899. Serial No. 736,402. (No model.)

*To all whom it may concern:*

Be it known that I, EUGENE R. EDSON, a resident of Cleveland, county of Cuyahoga, and State of Ohio, have invented certain new and useful Improvements in Washing or Cleaning Apparatus; and I do hereby declare the following to be a full, clear, and exact description of the invention, such as will enable others skilled in the art to which it pertains to make and use the same.

My invention relates to improvements in washing or cleaning apparatus more especially designed for cleaning and rinsing fish-scales, fish-sounds, fish-bladders, and other parts of fish and other material.

The object of this apparatus is to remove the slime and other foreign matter accumulating or formed upon the exterior of the fish-scales or material that requires washing and to render possible the treatment of a large quantity of material at one time.

With this object in view the invention consists in certain features of construction and combinations of parts hereinafter described, and pointed out in the claims.

In the accompanying drawings, Figure I is a view in perspective of apparatus embodying my invention. Fig. II is a diagonal vertical section on line II II, Fig. I. Fig. III is a top plan in horizontal section on line III III, Fig. II. The track $b$ and the tank $a$ are not shown in Fig. II, and the tank is omitted in Fig. III.

Referring to the drawings, $a$ designates a tank over which the fish-scales or material that requires washing is cleaned and which is adapted to receive the slime or other foreign matter removed from the material. The tank $a$ is shown only in Fig. I. A track $b$ extends over and across the said tank, and a carriage $c$, in which the fish-scales or material is cleaned, is mounted upon the said track and is movable endwise of the track from the place at which the material that requires cleaning is deposited in the carriage to the place over the aforesaid tank where the cleaning operation takes place.

The carriage $c$ consists, preferably, of a perforated receptacle or box or basket-like structure—that is, the sides and bottom of the said receptacle or box are provided with numerous perforations for draining from the material placed therein for cleaning the foreign matter removed from the material, together with the water that participated in the cleaning operation. The receptacle or box has, preferably, a cover or top $c'$, that may be perforate or imperforate, as desired. The four sides and the bottom and preferably the top of the box or receptacle are composed, preferably, of woven wire or a network of suitable material having the meshes, interstices, or perforations therethrough small enough to prevent the fish-scales or other material that is cleaned within the receptacle or box from escaping from the latter with the foreign matter and the cleansing liquid.

The receptacle or box is preferably quadranular in plan, and each corner of the box or receptacle is formed, preferably, by an upright pipe $e$, that is provided with three upright rows $e'$, $e^2$, and $e^3$ of lateral orifices arranged to discharge inwardly into the receptacle, and the three different rows of orifices are arranged, preferably, as required, to discharge in the direction of the different remaining upright pipes $e$, respectively—that is, one, $e'$, of the rows of orifices of each upright pipe $e$ is arranged centrally between the two other rows $e^2$ and $e^3$ of orifices of the said pipe and discharges diagonally into the central portion of the receptacle in the direction of the diagonally oppositely arranged pipe $e$, and the said rows $e^2$ and $e^3$ of orifices discharge into the receptacle at opposite sides, respectively, of the said central row $e$ in the direction of the two remaining upright pipes $e$. The orifices of each row are arranged, preferably, at short intervals, and each row of orifices extends, preferably, from end to end of the pipe provided with the said row of orifices. The wire or network composing the bottom, sides, and top of the receptacle and the pipes $e$ are secured or tied together in any approved manner. All of the said pipes $e$ are closed at their lower ends, as at $e^4$, and at their upper ends at the top of the receptacle are connected by means of elbows $d$ with pipes $f$, that converge toward the middle of the receptacle, where the said pipes $f$ are connected in common, by means of a five-armed pipe connection $g$, with a short pipe-section $g'$, that is removably connected, by means of a coupling $g^2$, with the valved water-supply pipe $h$, to which water under pressure is conveyed in any approved manner. Each pipe $f$ is preferably provided upon its under side with numerous downwardly-discharging orifices $f'$, arranged at short intervals longitudinally of the pipe.

After placing in the receptacle the desired mass of fish-scales or material to be cleaned the normally-closed valve $h'$ of the water-supply pipe is opened. During the operation of the apparatus numerous streams of water are discharged into the mass of material at different elevations and in different directions, and the material is consequently thoroughly agitated and stirred within the receptacle to such an extent that the water under pressure reaches every portion of the material and effectually cleans the material, and the foreign matter, together with the water that participated in the cleaning operation, escapes at the numerous perforations, meshes, or interstices in the sides and bottom of the receptacle into the tank arranged below.

The receptacle is provided with a door $l$ for affording access to the receptacle's interior as required to supply the receptacle with the material to be cleaned or to remove cleaned material therefrom. The receptacle illustrated has the door $l$, forming a portion of the bottom of the receptacle, and the said door is hinged at one end, as at $l'$, to the adjacent portion of the bottom, and is secured in its closed position by hooks or fastening devices $l^2$, that are easily manipulated. By uncoupling the pipe-section $g'$ of the receptacle from the water-supply pipe and then removing and turning the receptacle down side up and unfastening and opening the door $l$ material can readily be introduced into or removed from the receptacle.

What I claim is—

1. Apparatus of the character indicated, comprising a receptacle having a top or cover, a perforated bottom and perforated sides, upright pipes arranged a suitable distance apart at the outer portions of the receptacle and provided with numerous lateral orifices arranged to discharge inwardly into the receptacle, and means for supplying the cleaning liquid to the said pipes, substantially as and for the purpose set forth.

2. Washing or cleaning apparatus of the character indicated, comprising a perforated receptacle; upright pipes arranged a suitable distance apart within the outer portions of the receptacle, and provided with lateral orifices arranged to discharge inwardly into the receptacle; branch pipes converging from the aforesaid upright pipes; the valved water-supply pipe, and a pipe connection connecting the aforesaid branch pipes together and removably connected to the water-supply pipe, substantially as and for the purpose set forth.

3. Washing or cleaning apparatus of the character indicated, comprising a perforated receptacle; upright pipes arranged a suitable distance apart at the outer portions, and extending from top to bottom, of the receptacle, which pipes are closed at their lower ends and have numerous orifices arranged to discharge into the receptacle; branch pipes converging from the aforesaid upright pipes and provided with orifices arranged to discharge downwardly into the receptacle; the valved water-supply pipe; a pipe connection connecting together the said branch pipes, and means for coupling the said pipe connection to the water-supply pipe, substantially as and for the purpose set forth.

4. Apparatus of the character indicated, comprising a wire receptacle having a top or cover and having meshes in its sides and bottom; upright pipes arranged a suitable distance apart at the outer portions of the receptacle and provided with numerous lateral orifices arranged to discharge inwardly into the receptacle, and means for supplying the cleaning liquid to the said pipes, substantially as and for the purpose set forth.

Signed by me at Cleveland, Ohio, this 25th day of October, 1899.

EUGENE R. EDSON.

Witnesses:
C. H. DORER,
A. H. PARRATT.